E. W. BARRATT.
APPARATUS FOR PULLING SUGAR OR CANDY OR OTHER SUBSTANCES OF A SIMILAR PLASTIC NATURE.
APPLICATION FILED JAN. 20, 1909.

929,374.

Patented July 27, 1909.

UNITED STATES PATENT OFFICE.

EDWARD WILLIAM BARRATT, OF COLD NORTON, NEAR MALDON, ENGLAND.

APPARATUS FOR PULLING SUGAR OR CANDY OR OTHER SUBSTANCES OF A SIMILAR PLASTIC NATURE.

No. 929,374.        Specification of Letters Patent.        Patented July 27, 1909.

Application filed January 20, 1909. Serial No. 473,269.

*To all whom it may concern:*

Be it known that I, EDWARD WILLIAM BARRATT, a subject of the King of Great Britain, residing at The Rise, Cold Norton, near Maldon, in the county of Essex, England, have invented certain new and useful Improvements Relating to Apparatus for Pulling Sugar or Candy or other Substances of a Similar Plastic Nature, of which the following is a specification.

This invention relates to apparatus for "pulling" sugar or candy or other substance of a similar plastic nature in which one or more stationary rods and one or more rotary rods are combined with one or more sliding rods in such a manner that when operated by suitable mechanism, the rotary rods will travel around the stationary and sliding rods so as to perform the pulling operation of the sugar or candy when the latter is placed in a suitable condition of plasticity upon the stationary rods.

The present invention has for its chief object to dispense with certain of the rods, whereby the time involved in stripping the sugar or candy from the apparatus when required is reduced, and to so arrange the remaining rods that they may be all movable or be convertible at will into a combination of movable rods with a fixed rod.

According to this invention for effecting the pulling operation on the substance to be treated, I employ a rod, support, pulling bar, or other suitable holding device situated between two rotary similar devices, and adapted to be traversed to and fro across the path described by the rotary devices, the first mentioned device being adapted to be rigidly secured in a suitable position between the aforesaid rotary devices in which case the latter are arranged to describe circular paths eccentrically around the said fixed device.

In order that the said invention may be clearly understood and readily carried into effect I will describe the same with reference to the accompanying drawings, in which:—

Figure 1:
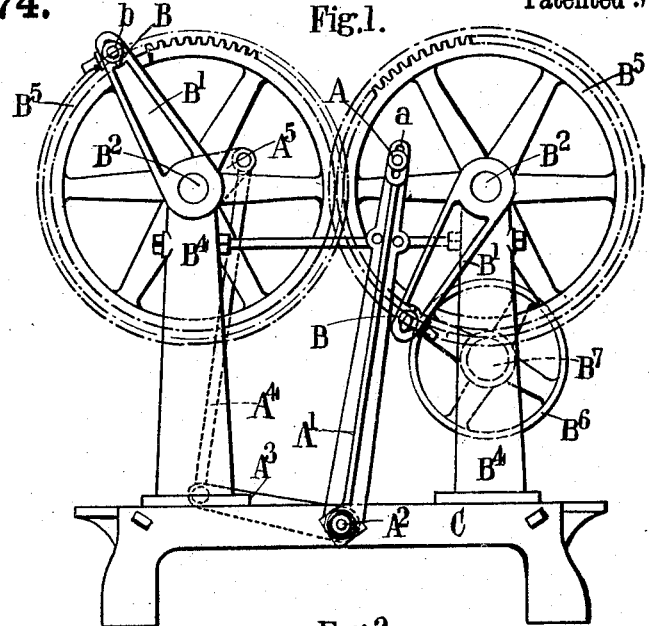
Figure 2:
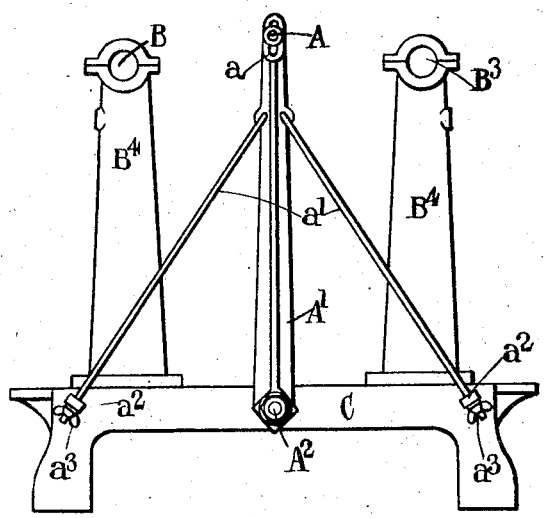
Figure 3:
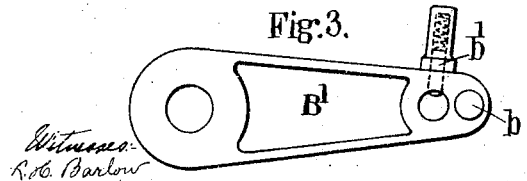
Figure 4:
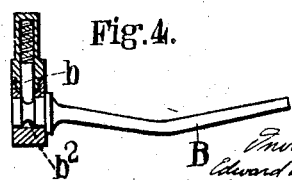

Figure 1 is a front elevation of apparatus according to this invention. Fig. 2 is a similar view of a portion of the apparatus showing a device for retaining the oscillatory holding or pulling bar in a stationary condition between the rotary pulling bars. Fig. 3 is a detached view of one of the cranks drawn to a larger scale, and Fig. 4 is a sectional end elevation of a crank and pulling bar.

A represents the oscillatory holding or pulling bar, and B the rotary pulling bars.

In the arrangement shown in Fig. 1 the rotary pulling bars B are mounted on cranks B' carried by axles $B^2$ supported in bearings $B^3$ on the pillars $B^4$ which are fixed to or may form part of the frame C. Keyed or otherwise fixed to the axles $B^2$ are spur wheels $B^5$ gearing with one another. Motion is imparted to one of such wheels by a pulley $B^6$ and a pinion $B^7$ thereby causing the other wheel together with its crank and pulling bar to rotate in the opposite direction.

The aforesaid pulling bars B are so mounted or arranged as to be capable of describing intersecting or non-intersecting circles at will. This may be effected for example, by providing one or more holes $b$ in the cranks B' to form bearings for cylindrical portions formed on the inner ends of the pulling bars B. A convenient method of securing each of such bars in position and for permitting of relative rotary movement between the bars and their respective cranks comprises a spring actuated plunger $b'$ (Fig. 4) adapted to engage with an annular groove $b^2$ extending around the cylindrical portion formed on the end of the pulling bar. This arrangement enables the pulling bars to be readily removed and replaced for cleaning or other purposes as required. The pulling bars are advantageously slightly cranked or bent as shown in Fig. 4 and owing to the said bars being rotatably mounted in their respective cranks the pull exerted upon the bars by the material under operation causes them to assume a position in which the material will collect toward the center of the pulling bars whereby liability of its spreading over the adjacent parts of the machine is obviated.

The intermediate holding or pulling bar A is mounted on a lever arm A' which is fixed on one end of a shaft $A^2$ journaled in the frame C. The opposite end of such shaft has secured to it a crank $A^3$ connected by a rod $A^4$ to a crank $A^5$ fixed on one of the axles $B^2$, rotary motion of which imparts an oscillatory movement to the lever arm $A^1$ through the connections above described. The bar A is advantageously adjustably mounted in the lever arm $A^1$ for which purpose the latter may be slotted as shown at $a$ for facilitating the disposal of the said bar in a correct position in relation to the path described by the rotary pulling bars.

Any suitable means may be employed for retaining the oscillatory bar A in an intermediate position between the rotary pulling bars B. In the arrangement illustrated in Fig. 2 two stays $a'$ passing through lugs $a^2$ carried by the frame C are hooked onto the opposite sides of the lever arm A', winged nuts $a^3$ being provided for imparting the requisite tension to the stays $a'$ for securely holding the aforesaid arm in its intermediate position. The mechanism for imparting the oscillating movement to the lever arm is so arranged as to be capable of being readily disconnected therefrom or put out of gear therewith, for example the rod $A^4$ may be removably connected with the cranks $A^3$ and $A^5$. When the said arm is required to act in a stationary capacity, each of the rotary bars is caused to describe a circular path eccentrically around the stationary bar. The aforesaid bars may be so arranged that they do not both pass the stationary bar at the same time.

What I claim and desire to secure by Letters Patent of the United States is:—

1. In apparatus for pulling plastic substances, the combination of a holding device situated between two rotary pulling devices, means for causing the latter to move through circular paths in opposite directions, means for causing the holding device to traverse to and fro across the paths described by the rotary pulling devices, and means for rigidly securing the holding device in a central position between the rotary pulling devices.

2. In an apparatus for pulling plastic substances, the combination of a holding device situated between two rotary pulling devices, means for causing the latter to move through circular paths in opposite directions, means for enabling the said pulling devices to describe intersecting or non-intersecting circles at will, means for causing the holding device to traverse to and fro across the paths described by the rotary pulling devices, and means for rigidly securing the holding device between the rotary pulling devices.

3. In an apparatus for pulling plastic substances, the combination of a holding device situated between two rotary pulling devices, means for causing the latter to move through circular paths in opposite directions, means for enabling the said pulling devices to describe intersecting or non-intersecting circles at will, means for causing the holding device to traverse to and fro across the paths described by the rotary pulling devices, means for rigidly securing the holding device between the rotary pulling devices, and means for facilitating the disposal of the holding device in a correct position in relation to the path described by the rotary pulling devices.

4. In apparatus for pulling plastic substances, the combination of two rotatably mounted shafts, a separate arm in rigid connection with each shaft, a pulling bar mounted on each arm and capable of radial adjustment thereon, a toothed wheel in rigid connection with one shaft gearing directly with a toothed wheel in rigid connection with the other shaft, an oscillatory shaft situated intermediately between the rotatably mounted shafts, an arm in rigid connection with the oscillatory shaft, a holding device carried by the said arm and capable of radial adjustment thereon, stays removably connected with the said arm for enabling the same to be secured in a central position between the rotatably mounted shafts, a second arm in rigid connection with the oscillatory shaft, a crank in rigid connection with one of the rotatably mounted shafts, and capable of being operatively connected therewith, and a pinion gearing with one of the aforesaid toothed wheels for imparting a rotary motion thereto.

5. In apparatus for pulling plastic substances, a pulling bar supporting arm formed with one or more bearings, a pulling bar bent intermediately of its length and terminating in a journal pin rotatably mounted in the said bearings, and a spring fastening device for retaining the pulling bar in position upon its supporting arm.

6. In apparatus for pulling plastic substances, a pulling bar supporting arm formed with one or more bearings, a pulling bar cranked intermediately of its length and terminating in a journal pin rotatably mounted in the said bearings, and an automatic spring fastening device for retaining the pulling bar in position upon its supporting arm and for enabling the said bar to be readily removed therefrom.

7. In apparatus for pulling plastic substances, a pulling bar supporting arm formed with a plurality of bearings, a pulling bar slightly cranked intermediately of its length and terminating at one end in a journal pin adapted to fit the said bearings, the said journal pin being formed with a groove extending around its periphery, a spring actuated plunger carried by the arm and having an appropriately shaped end to readily engage and disengage with the aforesaid groove when endwise movement is imparted to the pulling bar.

In testimony whereof I affix my signature in presence of two witnesses.

EDWARD WILLIAM BARRATT.

Witnesses:
T. SELBY WARDLE,
WALTER J. SKERTEN.